United States Patent [19]

Hass

[11] 3,832,443

[45] Aug. 27, 1974

[54] EXHAUST GAS CONVERSION PROCESS

[75] Inventor: Robert H. Hass, Fullerton, Calif.

[73] Assignee: Union Oil Company of California, Los Angeles, Calif.

[22] Filed: Aug. 26, 1971

[21] Appl. No.: 175,115

[52] U.S. Cl............. 423/213.7, 23/288 F, 60/274, 60/290, 60/301
[51] Int. Cl............................................ B01d 53/00
[58] Field of Search......... 23/2 E, 288; 60/290, 301; 423/213.5

[56] References Cited
UNITED STATES PATENTS

| | | | |
|---|---|---|---|
| 1,902,160 | 3/1933 | Frazer et al. | 23/2 E |
| 2,664,340 | 12/1953 | Houdry | 23/2 E |
| 3,109,715 | 11/1963 | Johnson et al. | 23/2 E |
| 3,186,806 | 6/1965 | Stiles | 23/288 F |
| 3,544,264 | 12/1970 | Hardison | 23/2 E |

*Primary Examiner*—G. O. Peters
*Attorney, Agent, or Firm*—Richard C. Hartman; Lannas S. Henderson

[57] ABSTRACT

A process is disclosed for the catalytic conversion of nitrogen oxides, unburned hydrocarbons and carbon monoxide in exhaust gases initially containing less than a stoichiometric ratio of oxygen to carbon monoxide. The basic novel feature of the process involves gradually increasing the oxygen concentration of the gases downstreamwardly in the conversion zone, in such manner as to maintain a generally increasing $O_2/CO$ mole-ratio in that section of the conversion zone (the initial section) in which the ratio of $O_2/CO$ is less than stoichiometric. In the latter part of the conversion zone, the ratio of $O_2/CO$ is greater than stoichiometric.

10 Claims, 3 Drawing Figures

PATENTED AUG 27 1974 3,832,443
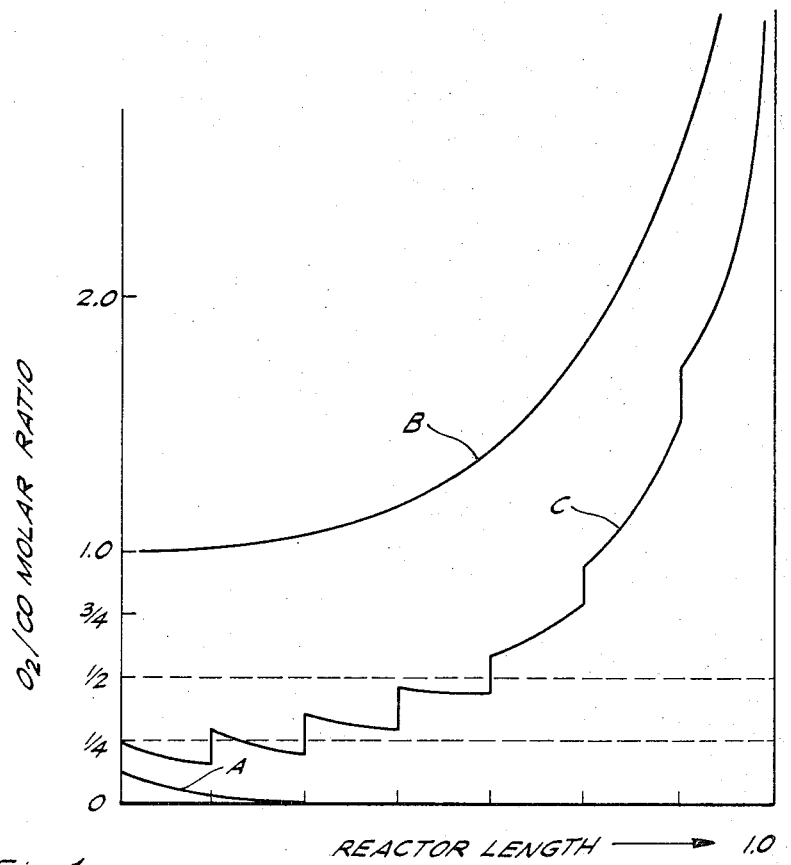
Fig 1
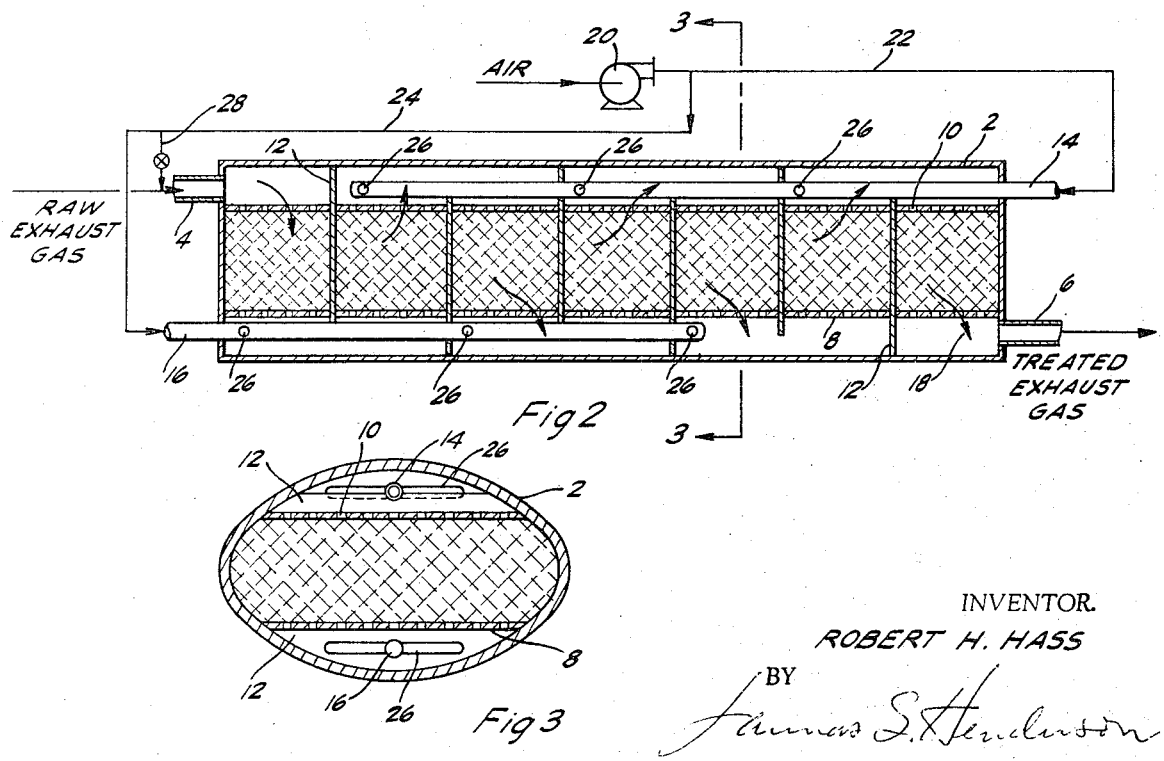
INVENTOR.
ROBERT H. HASS
BY
*James S. Henderson*
ATTORNEY

EXHAUST GAS CONVERSION PROCESS

BACKGROUND AND SUMMARY OF INVENTION

Much effort has been devoted in recent years to the development of thermal and catalytic converters for removing air pollutants such as hydrocarbons, carbon monoxide and nitrogen oxides from engine exhaust gases. In the catalytic field, the general approach has been to oxidize the unburned hydrocarbons and carbon monoxide with added air, and to use the carbon monoxide in the exhaust gases as a reducing agent to convert the nitrogen oxides to nitrogen as follows:

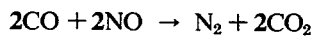

$$2CO + 2NO \rightarrow N_2 + 2CO_2$$

Considerable success has been achieved in the catalytic oxidation of unburned hydrocarbons and carbon monoxide, but the conversion of the nitrogen oxides has proven to be a much more difficult problem. Two-stage conversion systems have been proposed (as illustrated for example in U.S. Pat. No. 3,544,264), involving an initial contacting zone in which the raw exhaust gases are passed under reducing conditions over a suitable catalyst in the absence of added air, followed by a second zone in which oxidation is effected after adding to the first stage off-gases at least a stoichiometric proportion of air. The principal problem with these systems is that the catalyst utilized in the first stage becomes rapidly deactivated under the conditions previously utilized. The consistent failure of the first-stage conversion zone has led to such drastic proposals as recycling a portion of the exhaust gases to the engine combustion zone to reduce temperatures therein and thereby reduce the production of nitrogen oxides. This of course significantly reduces engine performance.

I have now discovered a simple technique by which all three of the above noted contaminants can be effectively converted in a single contacting zone if desired, thereby eliminating the need for recycling of exhaust gas. Briefly stated this technique consists in maintaining a gradually increasing $O_2/CO$ ratio in the initial section of the catalyst bed wherein "net reducing" conditions prevail, i.e., where the $O_2/CO$ mole ratio is less than stoichiometric (1/2). This is a surprising discovery, for heretofore those skilled in the art appear to have assumed that maximum efficiency would be obtained in the $NO_x$ conversion zone by maintaining a strongly reducing atmosphere, i.e., one in which a maximum ratio of $CO/O_2$ is maintained. I have found that this is apparently not true; there is apparently an optimum ratio of $O_2/CO$ which is needed for maintaining maximum activity of the catalyst. This ratio varies for different catalysts, but for copper or copper chromite catalysts, appears to range between about 1/4 and 1/2. The explanation for this phenomenon is uncertain but it can be hypothesized that: (1) the active catalyst species for $NO_x$ conversion is an oxidizable and reducible metal oxide, i.e., a metal oxide wherein the metal has a valence intermediate between zero and its highest valence state; (2) some oxygen must be maintained in the $NO_x$ conversion zone in order to keep the catalyst from being reduced to the zero-valent, free metal state; and (3) sufficient CO must be maintained in the same zone to react with the $NO_x$ and to keep the catalyst from being oxidized to its highest valence state. (It should be noted that when $O_2/CO$ ratios are referred to herein, the oxygen required to provide such ratio is actually the excess over a small additional proportion which will be required to oxidize other oxidizable components in the exhaust gas, principally unburned hydrocarbons and hydrogen.)

Irrespective of theory, if $NO_x$ conversion does depend upon maintaining a critical $O_2/CO$ ratio in some portion of the catalyst bed, the problem is presented of how to maintain this ratio under all conditions of engine operation. Depending upon a number of operating conditions (primarily air/fuel ratio), the carbon monoxide content of exhaust gases varies considerably, from about 0.2 to 4 volume-percent under normal operating conditions. The oxygen content may vary from about 0 — 1 percent. It would obviously be a very difficult and expensive endeavor to attempt to maintain a constant $O_2/CO$ ratio in the gases fed to the catalytic converter. By my technique of gradually injecting oxygen along the length of the contacting zone, thereby providing an increasing $O_2/CO$ ratio downstreamwardly, a zone will always be reached where the critical $O_2/CO$ ratio prevails. This zone will shift automatically upstreamwardly or downstreamwardly in the catalyst bed, depending upon the initial CO and $O_2$ content of the exhaust gases. I have found that the critical $NO_x$ conversion ratio of $O_2/CO$ need be maintained only in a small section of the contacting zone, for under these optimum conditions $NO_x$ conversion proceeds rapidly.

From the foregoing discussion, the failure to maintain $NO_x$ conversion in the conventional two-stage systems can be readily understood. In the first stage, to which no air is added, the raw exhaust gases are rich in CO and lean in oxygen; the $O_2/CO$ mole ratio is seldom if ever above 1/4 and this ratio rapidly declines along the length of the catalyst bed as the oxygen is consumed. In the second stage, a greater than stoichiometric proportion of air is mixed with the gases at the inlet thereto. Under these net oxidizing conditions, there will always be an ascending gradient of $O_2/CO$ ratio downstreamwardly in the catalyst bed. Thus, in neither zone is there opportunity for the critical ratio of $O_2/CO$ to be reached in any section of the catalyst beds.

Reference is made to FIG. 1 for a graphic illustration of the foregoing discussion. Curves A, B, and C represent $O_2/CO$ profiles through catalyst beds operated under exhaust gas conversion conditions. Curve A is typical of a conventional first-stage conversion zone to which no air is added. Curve B is typical of the second stage of a conventional two-stage system to which twice the stoichiometric ratio of air is added at the inlet. Curve C represents a typical profile occurring in a reactor such as that illustrated in FIGS. 2 and 3, wherein twice the stoichiometric amount of air is admitted along the length of the reactor in seven increments. It will be seen that a segment of curve C traversing the $O_2/CO$ ratio interval of 1/4 to 1/2 will still prevail even though such segment may shift to the right in response to a lower $O_2/CO$ ratio in the raw exhaust gas, or to the left in response to a higher $O_2/CO$ ratio.

DETAILED DESCRIPTION

A. Catalysts

Operative catalysts for use herein comprise any one or more of the multivalent transitional metal oxides which are relatively easily reduced from a polyvalent metal oxide to a lower valent oxide. The term "multivalent" is used to designate metals having more than one positive valence. This includes primarily the metals of Groups IB, VB, VIB, VIIB and VIII of the Periodic Table. The preferred metals are copper, chromium, silver, vanadium, manganese, iron, cobalt, nickel, platinum and palladium, any of which may be used singly or in any desired combination. The active component or components may be composited with, or supported upon, a suitable refractory inorganic oxide such as alumina, silica-alumina, silica-zirconia, or the like. As to form or shape, the catalyst may be supplied as spheres, extrudates, cylinders, or pellets arranged in the form of a confined bed or beds. When spheres or pellets are used they should be of a dimension such that they will be retained within a perforate catalyst retaining structure and will not bring about an unduly large pressure drop through the bed or beds. The preferred catalysts consist of copper or copper chromite supported on alumina pellets of about ⅛ inch diameter. Supported catalysts normally comprise about 0.5 to 40 weight percent of the active metal oxide or oxides.

B. Description of Drawings

Referring now to the drawings:

FIG. 1 has been previously described.

FIG. 2 is a longitudinal, vertical cross-section of a suitable catalytic muffler type apparatus for practicing the described process.

FIG. 3 is a lateral cross-sectional view taken along line 3—3 of FIG. 2.

Referring now more particularly to FIGS. 2 and 3, the muffler comprises an outer housing 2 communicating at one end with raw exhaust gas inlet 4 and at the other end with treated exhaust outlet 6. The outer housing is shown as being elliptical in cross sectional shape, but obviously may be constructed in other shapes such as circular or rectangular.

The internals of the muffler consist principally of a perforated catalyst supporting member 8, an upper perforated catalyst retaining plate 10, a plurality of staggered, imperforate baffles 12, an upper air supply tube 14 and a lower air supply tube 16. Each baffle 12 is affixed in fluid-tight relationship to the outer shell 2, except that a segment of each is cut away, alternately at the bottom and the top of each succeeding baffle, so as to provide gas passageways 18 around the bottom and the top of alternating baffles. With this arrangement it will be seen that exhaust gases entering via inlet 4 pass downwardly through the first catalyst bed, around the bottom of first baffle 12, then upwardly through the next catalyst bed, and so on through each catalyst bed until exhaust gas outlet 6 is reached. Operative conversion temperatures range between about 600° and 1,700° F.

Air is pumped into the muffler via pump 20 and air delivery lines 22 and 24. Upon entering air supply tubes 14 and 16, air is further distributed within the muffler by means of a plurality of distributor tubes 26, which extend horizontally outwardly from tubes 14 and 16, and are spaced to deliver air alternately below and above each of the catalyst beds from which exhaust gases are emerging en route to the next catalyst bed. Air distributor tubes 26 may consist of perforated tubes closed at each end, or they may be constructed of foraminous metal such as sintered Inconel or stainless steel. The objective is to distribute the incoming air as evenly as possible over the cross-sectional area of the exhaust gas passageways exterior of the catalyst beds.

Obviously, many other arrangements could be designed to effect the same end result.

Ordinarily, it is desirable to also inject a small proportion of air to the raw exhaust gas entering inlet 4. This is accomplished by means of valved transfer line 28. A total of at least four mixing points is preferred.

Air distributing tubes 26 may be designed to deliver the same or different amounts of air along the length of the reactor. Ordinarily it is desirable to deliver about the same amount of air at each mixing point in the reactor, but this may vary depending upon the type of catalyst used. It may in some cases be desirable to deliver relatively more air near the inlet of the reactor than is delivered downstreamwardly, and in some cases the reverse may be true. In any case an average, ascending $O_2/CO$ mole ratio is maintained downstreamwardly in the reactor. The total amount of air delivered to the reactor is easily regulated by means of suitable pressure controls on pump 20. This pressure control can be a differential pressure controller responsive to manifold exhaust gas pressures, thereby automatically varying the volume of air injected in response to exhaust volume and engine speed. However, the same objective can be achieved more economically by simply gearing the pump to the RPM of the engine.

C. Example

The following illustrates a suitable specific modification of the process:

A seven-zone muffler device similar to that illustrated in FIGS. 2 and 3 is filled with ten pounds of a copper chromite-alumina catalyst containing 14.5 percent CuO and 14 percent $Cr_2O_3$. An engine exhaust gas containing 2.0 volume-percent carbon monoxide, 0.25 percent hydrocarbons, 0.125 percent nitric oxide, 13 percent carbon dioxide, 10 percent water vapor, 0.5 percent oxygen, and 73 percent nitrogen is passed through the converter at a GHSV of 15,000 volumes per volume of catalyst per hour and at an inlet temperature of 850° F. Air is injected in equal increments at each of the seven mixing zones in an overall amount sufficient to provide 1.5 moles of $O_2$ for each mole of CO. Over a period of 24 hours the conversion of nitric oxide, hydrocarbons and carbon monoxide is over 90 percent. The same results are observed when the carbon monoxide content of the feed gas is increased to 4 volume-percent by varying the air/fuel ratio fed to the engine, while doubling the rate of air injection in the muffler with respect to the exhaust rate.

In contrast to the foregoing, when the injection of air is terminated, the nitric oxide conversion begins to drop off after several hours of operation, and in a matter of 24 hours there is substantially no conversion of nitric oxide. In the absense of any added air the conversion of carbon monoxide and hydrocarbons is of course limited to the stoichiometric amount of oxygen present in the raw exhaust. When an equal overall volume of air is admixed with the incoming exhaust at the inlet to the converter, good conversion of hydrocarbons and carbon monoxide is obtained, but nitric oxide conversion substantially ceases within an hour or so. But it is found that after the catalyst has been deactivated for NO conversion by operating in this fashion, such activity is restored by operating as initially described, with incremental air injection down the length of the converter.

While the foregoing has dealt with specific preferred embodiments of the invention, it should be apparent that the basic principles have a much broader application. The basic concept of maintaining a gradually increasing $O_2/CO$ mole ratio downstreamwardly through a catalyst zone operating under net reducing conditions is applicable to the cleanup of any gas stream containing carbon monoxide and nitric oxides. Specific other applications include nitrogen oxide abatement in stack gases, diesel exhaust, etc. The true scope of the invention is intended to be defined by the following claims and their obvious equivalents:

I claim:

1. In a process for the catalytic conversion of a gas stream containing nitrogen oxides and substantially varying proportions of carbon monoxide, and in which the $O_2/CO$ mole ratio is less than 1/2, wherein said gases are passed at elevated conversion temperatures through a contacting zone containing an oxidation-reduction catalyst comprising at least one easily reducible oxide of a multivalent transitional metal, and wherein air is injected into the flow path of said gases at a plurality of points in said contacting zone thereby establishing a downstream zone in which net oxidizing conditions prevail and an upstream zone in which net reducing conditions prevail, the improvement which comprises injecting air into said upstream zone at a plurality of points along its length in incremental amounts insufficient to provide at any point therein an $O_2/CO$ ratio greater than 1/2, but sufficient to provide a generally ascending profile of $O_2/CO$ ratios along the length thereof.

2. A process as defined in claim 1 wherein said gas stream consists of automotive exhaust gases.

3. A process as defined in claim 1 wherein said oxidation-reduction catalyst comprises an oxide of at least one metal selected from the class consisting of the metals of Groups IB, VB, VIB, VIIB and VIII of the Periodic Table, supported upon a refractory oxide carrier.

4. A process as defined in claim 1 wherein said oxidation-reduction catalyst comprises an oxide of at least one metal selected from the class consisting of copper, silver, vanadium, chromium, manganese, iron, cobalt, nickel, palladium and platinum supported upon a refractory oxide carrier.

5. A process as defined in claim 1 wherein said oxidation-reduction catalyst comprises an oxide of copper or chromium supported on a refractory oxide carrier.

6. A process as defined in claim 1 wherein said oxidation-reduction catalyst comprises an oxide of copper supported on a refractory oxide carrier, and wherein said addition of air is controlled so as to provide a mole-ratio of $O_2/CO$ of between about 1/4 and 1/2 in at least a portion of said upstream zone.

7. In a process for the conversion of automotive exhaust gases containing substantially varying proportions of carbon monoxide and nitrogen oxides, and in which the $O_2/CO$ mole ratio is below about 1/4, wherein said exhaust gases are passed at temperatures above about 700° F through a contacting zone in contact with an oxidation-reduction catalyst comprising at least one easily reducible oxide of a multivalent metal selected from the class consisting of the Group IB, VB, VIB, VIIB and VIII metals, and wherein air is injected into the flow path of said gases at a plurality of points in said contacting zone thereby establishing a downstream zone in which net oxidizing conditions prevail and an upstream zone in which net reducing conditions prevail, the improvement which comprises injecting air into said upstream zone at a plurality of points along its length in incremental amounts insufficient to provide at any point therein an $O_2/CO$ ratio greater than 1/2, but sufficient to provide a generally ascending profile of $O_2/CO$ ratios along the length thereof.

8. A process as defined in claim 7 wherein said oxidation-reduction catalyst comprises an oxide of at least one metal selected from the class consisting of copper, silver, vanadium, chromium, manganese, iron, cobalt, nickel, palladium and platinum supported upon a refractory oxide carrier.

9. A process as defined in claim 7 wherein said oxidation-reduction catalyst comprises an oxide of copper or chromium supported on a refractory oxide carrier.

10. A process as defined in claim 7 wherein said oxidation-reduction catalyst comprises an oxide of copper supported on a refractory oxide carrier, and wherein said addition of air or oxygen is controlled so as to provide a mole-ratio of $O_2/CO$ of between about 1/4 and 1/2 in at least a portion of said reducing zone.

* * * * *